2,790,810
Patented Apr. 30, 1957

2,790,810

MERCAPTOLS AND ACETALS OF 5-OXO-1,3-DITHIANE

Edward G. Howard, Jr., Wilmington, Del., assignor to E. I. du Pont de Nemours and Company, Wilmington, Del., a corporation of Delaware No Drawing. Application August 26, 1954, Serial No. 452,459

9 Claims. (Cl. 260—327)

This invention relates to new compositions of matter and to their preparation.

The preparation and properties of 4-ethoxycarbonyl-5-oxo-1,3-dithiane are described by Challenger et al., J. Chem. Soc. 347 (1939). According to these authors, treatment of this compound with 2N sodium hydroxide results in ring cleavage, with formation of methylene-bis-thioacetic acid.

This invention has as an object the preparation of derivatives of 5-keto-1,3-dithiane in which derivatives the dithiane ring is stable toward alkaline hydrolysis. A further object is the preparation of new compounds. Another object is the preparation of new rancidity inhibitors. Other objects will appear hereinafter.

These objects are accomplished by the present invention of 1,3-dithianes in which the carbon atom in position 5 of the dithiane ring is directly linked by a single bond to each of two chalcogens of atomic number less than 17, the remaining valences of said chalcogens being satisfied by hydrocarbon radicals which may be open chain or form part of a cyclic system. The 1,3-dithianes of this invention are obtained by reacting a 5-oxo-1,3-dithiane with an alcohol or mercaptan in the presence of an acid. The acetal or thioacetal thus obtained is isolated by distillation and/or recrystallization.

In a convenient and practical way for preparing the acetals and thioacetals of this invention, a reactor is charged with a non-oxidizing mineral acid and a mixture of a 4-alkoxycarbonyl-5-oxo-1,3-dithiane or a 5-oxo-1,3-dithiane and an alcohol or mercaptan. In the case of the alcohols, it is desirable to use a large excess of the alcohol (molar ratio of alcohol to oxo compound, 10:1 or higher) and, if the alcohol is monohydric, to use it in the form of the corresponding orthoformic ester. The charge is stirred at about 25°–100° C. until reaction is complete, which generally requires from 30 minutes to 10 hours, depending upon the particular reactants used. The reaction product is generally crystalline and may be purified by recrystallization from such solvents as methanol, ethanol, benzene, acetic acid, etc.

The 4-alkoxycarbonyl-5-oxo-1,3-dithiane is formed by intramolecularly condensing the thioacetal from an aldehyde or ketone with an α-mercaptomonocarboxylic acid ester having hydrogen on α carbon of the acid. The condensation is effected in solution in alcohol in the presence of a basic reagent after which the reaction mixture is poured into an ice water-strong mineral acid-ether mixture, the aqueous layer is reextracted with ether and the combined ether extracts are dried and distilled.

The following examples are illustrative of the invention.

EXAMPLE I

A mixture of 100 ml. of ethylene glycol and 20 g. (0.10 mole) of 4-ethoxycarbonyl-5-oxo-1,3-dithiane

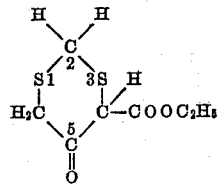

was saturated with dry hydrogen chloride and the mixture heated on a steam bath for one hour. After cooling and storage overnight at ambient temperature, there was obtained 23 g. of the acetal, 6-ethoxycarbonyl-1,4-dioxa-7,9-dithiaspiro[4.5]-decane,

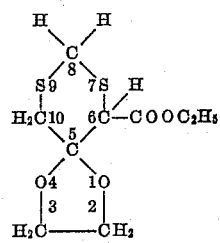

which on recrystallization from ethanol, melted at 59°–60° C.

*Analysis.*—Calculated for $C_9H_{14}S_2O_4$: C, 43.18%; H, 5.65%; S, 25.62%. Found: C, 43.49%; H, 5.76%; S, 25.66%.

By employing other aldehydes R.CHO in place of the formaldehyde of Challenger there are obtained diethyl 3,5-dithiapimelates having R on the 4 carbon. 4-disubstituted dithiapimelates may also be obtained by the method of Shriner et al., J. Am. Chem. Soc., 61 2001–3 (1939). When these are condensed, employing sodium ethoxide as the condensing agent, there are obtained 4-ethoxycarbonyl-5-oxo-1,3-dithianes having one or two R substituents on the 2-carbon of the ring depending on the substituents on the 4 carbon of the dithiapimelate. Thus acetaldehyde gives the 2-methyl-, propionaldehyde the 2-ethyl-, benzaldehyde the 2-phenyl-4-ethoxycarbonyl-5-oxo-1,3-dithianes. When a ketone $R_2CO$ is employed instead of formaldehyde, the dithiane with two R's on the 2 carbon is the ultimate product, i. e., from acetone the 2,2-dimethyl-, from acetophenone the 2-methyl-2-phenyl-, from benzophenone the 2,2-diphenyl-4-ethoxycarbonyl-5-oxo-1,3-dithianes.

When an ester of an α mercaptocarboxylic acid having a hydrogen on the α carbon, other than an ester of mercaptoacetic acid, i. e., one of the formula

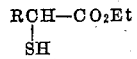

is employed, the ultimate dithiane contains R on the 4 and 6 carbons. Thus the use of α-mercaptopropionic esters results in the 4,6-dimethyl derivatives, of α-mercaptobutyric esters in the 4,6-diethyl derivatives, of α-mercaptophenylacetic acid, in the 4,6-diphenyl derivatives, etc.

EXAMPLE II

A solution of 2.5 g. (0.01 mole) of 6-ethoxycarbonyl-1,4-dioxa-7,9-dithiaspiro[4.5]decane, prepared as in Example I, and 0.8 g. (0.02 mole) of sodium hydroxide in 25 ml. of water and 15 ml. of ethanol was permitted to stand overnight, and then heated on a steam bath for five hours. This removed the alcohol by evaporation and completed the saponification. The reaction mixture was allowed to cool and acidified with concentrated hydrochloric acid. The solid acid which precipitated weighed 2 g. (90% of theory). After recrystallization from water, the product (6 - carboxy - 1,4 - dioxa - 7,9 - dithiaspiro[4.5]decane) melted at 200°–201° C. with evolution of carbon dioxide.

Analysis.—Calculated for $C_7H_{10}S_2O_4$: C, 37.83%; H, 4.53%; S, 28.85%. Found: C, 38.19%; H, 4.59%; S, 29.07%.

EXAMPLE III

In a small gas-tight flask, 4 g. (0.018 mole) of 6-carboxy-1,4-dioxa-7,9-dithiaspiro[4.5]decane, prepared as in Example II, was heated at 140°–170° C. for one hour. There was obtained 3 g. (94% of theory) of a white solid (1,4-dioxa-7,9-dithiaspiro[4.5]decane), which after recrystallization from water melted at 105–105.5° C.

Analysis.—Calculated for $C_6H_{10}O_2S_2$: C, 35.96%. Found: C, 36.30%.

EXAMPLE IV

A. Dry hydrogen chloride was passed through a mixture of 152 g. of 4 - ethoxycarbonyl - 5 - oxo - 2(o-chlorophenyl)-1,3-dithiane, prepared as described below, and 200 ml. of ethylene glycol until the mixture was saturated. The mixture was then heated on the steam bath and stirred frequently. After cooling in an ice bath, a lower very viscous layer formed, which was treated twice more with 150 ml. of fresh ethylene glycol and hydrogen chloride. The resulting solid was collected by filtration, washed with ethanol, pulverized with cold ethanol in a Waring Blendor, and filtered. There resulted 95 g. of product,[6 - ethoxycarbonyl - 8 - (o-chlorophenyl) - 1,4-dioxa-7,9-dithiaspiro[4.5]decane], melting at 120°–121° C. after recrystallization from ethanol.

Analysis.—Calculated for $C_{15}H_{17}S_2O_4Cl$: C, 49.92%; H, 4.75%; S, 17.77%. Found: C, 50.14%; H, 4.78%; S, 17.72%.

B. The 4-ethoxycarbonyl-5-oxo-2(o-chlorophenyl)-1,3-dithiane used above was prepared as follows:

To a solution of 1 mole of sodium ethoxide dissolved in 400 ml. of absolute ethanol and 500 ml. of anhydrous ether at 0° C. was added 363 g. (1 mole) of diethyl 4(o-chlorophenyl)-3,5-dithiapimelate, prepared as described subsequently in one portion. The mixture was kept at 0° C. for eight hours and at room temperature for 12 hours. It was worked up by pouring into a mixture of 500 g. of ice, 500 ml. of water, and 120 ml. of concentrated hydrochloric acid. The organic layer was separated, washed with water, and dried over anhydrous magnesium sulfate. After removal of the ether, there remained 300 g. of clear red viscous liquid.

Crystallization was induced first in a small sample by dissolving the crude product in absolute ethanol, cooling in ice, and scratching with a glass rod. A few of these crystals were used to seed the reaction product. The paste-like mass was ground with cold ethanol, cooled, filtered, and washed with cold ethanol. There was thus obtained 175 g. of white solid [4-ethoxycarbonyl-5-oxo-2(o-chlorophenyl)-1,3-dithiane], which, after recrystallization from ethanol, melted at 48°–49° C.

Analysis.—Calculated for $C_{13}H_{13}ClO_3S_2$: Cl, 11.19%; S, 20.24%. Found: Cl, 11.52%; S, 20.16%.

C. The diethyl 4(o-chlorophenyl)-3,5-dithiapimelate used above was prepared as follows:

Dry hydrogen chloride was bubbled through a mixture of 211 g. (1.5 moles) of o-chlorobenzaldehyde (freshly distilled) and 360 g. (3 moles) of ethyl mercaptoacetate until the temperature did not rise on further addition of hydrogen chloride. After standing for one hour, the product was taken up in ether, washed with water and 5% sodium hydroxide until the washings gave no oil on acidification. After washing once more with water, the product was dried over anhydrous magnesium sulfate, the ether was removed by distillation and the residue heated to 230° C. under 2.5 mm. pressure. There resulted 425 g. of diethyl 4(o - chlorophneyl) - 3,5 - dithiapimelate.

Analysis.—Calculated for $C_{15}H_{19}ClO_4S_2$: Cl, 9.77%; S, 17.65%; M. W. 363. Found: Cl, 9.52%; S, 17.90%; M. W. 390, 386.

EXAMPLE V

To a hot solution of 72 g. (0.2 mole) of 6-ethoxycarbonyl - 8 - (o - chlorophenyl) - 1,4 - dioxo - 7,9 - dithiaspiro[4.5]-decane, prepared as in Example IV, in 200 ml. of ethanol was added a solution of 16 g. (0.64 mole) of sodium hydroxide in 40 ml. of water. Some solid formed, which slowly redissolved, then 200 ml. of water was added. After cooling on the steam bath to remove ethanol and to complete saponification, the mixture was cooled and acidified. There resulted a taffy-like material which was redissolved in sodium hydroxide and cooled. This caused the sodium salt of 10-carboxy-8-(o-chlorophenyl) - 1,4 - dioxa - 7,9 - dithiaspiro - [4.5] decane to form. Twelve grams of this salt was collected. After recrystallization from water, it melted with decomposition at 269°–272.5° C.

Analysis.—Calculated for $C_{13}H_{12}S_2ClO_4Na$: S, 18.07%; Na, 6.5%. Found: S, 18.13%; Na, 6.5%.

The mother liquor from which the sodium salt was isolated was heated to 80° C., acidified, and cooled immediately. The product was recrystallized from ethanol to give 15 g. of a white solid, m. p. 190°–192° C. (dec.). A sample was recrystallized from ethanol and analyzed.

Analysis.—Calculated for $C_{13}H_{13}S_2O_4Cl$: S, 19.26%. Found: S, 18.91%.

Evaporation of the mother alcohol liquor, from which the above acid was recrystallized, gave an additional 46 g. of crude 6-carboxy-8-(o-chlorophenyl)-1,4-dioxa-7,9-dithiaspiro[4.5]decane.

EXAMPLE VI

The 46 g. of crude acid obtained in Example V was heated at 160°–170° C. for 3 hours, or until no more carbon dioxide was liberated. The dark brown mass was dissolved in absolute ethanol, treated with decolorizing charcoal, filtered, and cooled. There resulted 14 g. of a pale yellow solid [8-(o-chlorophenyl)-1,4-dioxa-7,9-dithiaspiro[4.5]decane]. It melted at 123°–124° C. after recrystallization once more from ethanol.

Analysis.—Calculated for $C_{12}H_{13}S_2ClO_2$: C, 49.90%; H, 4.54%; S, 22.20%; Cl, 12.26%. Found: C, 49.91%; H, 4.65%; S, 22.39%; Cl, 12.41%.

EXAMPLE VII

A. Sodium ethoxide was prepared by adding 27.8 g. (1.21 g. atom) of sodium metal to 450 ml. of absolute ethanol in a 3-necked, 3-liter flask fitted with a stirrer, condenser, and dropping funnel. When no sodium remained, the condenser was replaced by a thermometer. After 700 ml. of absolute diethyl ether had been added, the stirred mixture was cooled to 0° C., then 340 g. (1.21 moles) of diethyl 4,4-dimethyl-3,5-dithiapimelate [(CH$_3$)$_2$C(SCH$_2$COOEt)$_2$], prepared as described in Shriner et al., J. Am. Chem. Soc., 61 2001–3 (1939), was added in one portion. The temperature was maintained at 0°–5° C. for 6 hours, and finally at room temperature overnight. The product was worked up by pouring into a water/hydrogen chloride/ice mixture and collected by ether extraction. The product was extracted from this ether solution with cold aqueous 5% sodium hydroxide until the extract did not become milky upon acidification. The cold sodium hydroxide extract was acidified and extracted with ether. After drying with magnesium sulfate, the ether was removed by distillation. There remained 260 g. of clear, pale yellow oil which could not be induced to solidify nor distilled without decomposition. The product gave a positive ketone test with 2,4-dinitrophenylhydrazine reagent.

The above product was suspended in 300 ml. of ethylene glycol, saturated with dry hydrogen chloride, and kept hot on the steam bath for one-half hour. On cooling, a viscous oil resulted, which eventually solidified on cooling and scratching its glass container in the normal fashion with a glass rod. The free flowing white solid (6 - ethoxycarbonyl - 8,8 - dimethyl - 1,4 - dioxa - 7,9 - dithiaspiro[4.5]decane) weighed 230 g., after washing with cold absolute ethanol and drying. A sample of the product was recrystallized from ethanol, m. p. 76°–77° C.

*Analysis.*—Calculated for $C_{11}H_{18}S_2O_4$: C, 47.46%; H, 6.49%; S, 23.03%. Found: C, 47.65%; H, 6.61%; S, 22.86%.

EXAMPLE VIII

A solution of 161 g. of 6-ethoxycarbonyl-8,8-dimethyl-1,4-dioxa-7,9-dithiaspiro[4.5]decane, prepared as in Example VII, and 40 g. of sodium hydroxide in 300 ml. of water and 200 ml. of ethanol was permitted to stand overnight and then heated on a steam bath. This removed the alcohol by evaporation and completed the saponification. The reaction mixture was allowed to cool and acidified with concentrated hydrochloric acid. The solid which precipitated weighed 130 g. After recrystallization from benzene, the product, 6-carboxy-8,8-dimethyl-1,4-dioxa-7,9-dithiaspiro[4.5]decane, weighed 120 g., melting at 114°–115° C.

*Analysis.*—Calculated for $C_9H_{14}S_2O_4$: C, 43.18%; H, 5.67%; S, 25.87%. Found: C, 43.34%; H, 5.71%; S, 25.87%.

EXAMPLE IX

In a small gas-tight flask, 25 g. of 6-carboxy-8,8-dimethyl-1,4-dioxa-7,9-dithiaspiro[4.5]decane, prepared as in Example VIII, was heated at 122°–140° C. for one hour to give 20 g. of a white solid (8,8-dimethyl-1,4-dioxa-7,9-dithiaspiro[4.5]decane), melting at 76.5°–77.5° C.

*Analysis.*—Calculated for $C_8H_{14}S_2O_2$: C, 46.51%; H, 6.84%; S, 31.08%. Found: C, 46.63%, 46.53%; H, 7.01%, 6.96%; S, 31.00%.

EXAMPLE X

A stirred mixture of 22.2 g. (0.01 mole) of 6-carboxy-1,4-dioxa-7,9-dithiaspiro[4.5]decane and 45.3 g. (0.30 mole) of thionyl chloride was heated at 37°–39° C. until sulfur dioxide and hydrogen chloride no longer were evolved. The resulting clear yellow solution was stored overnight at room temperature, and excess thionyl chloride was removed by vacuum distillation. There was thus obtained 23.5 g. of 6-chloroformyl-1,4-dioxa-7,9-dithiaspiro[4.5]decane, which, after two recrystallizations from anhydrous benzene, melted at 91°–91.5° C.

*Analysis.*—Calculated for $C_7H_9S_2O_3$: S, 26.64%; Cl, 14.73%. Found: S, 26.84%; Cl, 14.84%.

EXAMPLE XI

A few grams of the 6-chloroformyl-1,4-dioxa-7,9-dithiaspiro[4.5]decane, prepared as described above, was dissolved in benzene to which there was added a large excess of ammonia in ether solution. The mixture was stirred for one-half hour and the solvent removed by evaporation at room temperature. After extracting the ammonium chloride with water from the residue, a portion was recrystallized from ethyl alcohol. The product (6-carbamoyl-1,4-dioxa-7,9-dithiaspiro[4.5]decane) melted at 179.5°–181° C.

*Analysis.*—Calculated for $C_7H_{11}S_2NO_3$: C, 37.99%; H, 6.98%; N, 6.33%; S, 28.98%. Found: C, 38.37%; H, 5.20%; N, 6.33%; S, 29.10%.

EXAMPLE XII

To a hot solution of 1.35 g. (0.01 mole) of 5-oxo-1,3-dithiane, prepared as described in Example I in my copending cofiled application Ser. No. 452,460 by the decarboxylation and hydrolysis of the 6-carboxy-1,4-dioxa-7,9-dithiaspiro[4.5]decane of Example II in 10 ml. of ethylene glycol, dry hydrogen chloride was added by bubbling during one minute. After cooling the mixture in ice, a white solid (1.4 g.) separated. This product melted at 105°–105.5° C. when recrystallized from absolute ethanol. No depression of melting point was noted when this product was mixed with the sample of 1,4-dioxa-7,9-dithiaspiro[4.5]decane obtained in Example III.

EXAMPLE XIII

A mixture of 10.3 g. (0.05 mole) of 4-carboethoxy-5-oxo-1,3-dithiane and 11 g. (0.1 mole) of thiophenol was warmed to give a clear solution, which was then saturated with dry hydrogen chloride. The mixture was stored at room temperature for 10 weeks, after having been heated for 30 minutes. The reaction mixture was then treated with ether, the ether solution separated, washed with water, then with cold 10% sodium hydroxide until the extracts remained clear upon acidification, and finally with water. The ether solution was dried over anhydrous magnesium sulfate and then the ether was removed by vacuum distillation. The residue thus obtained weighed 13 g. after it was dried at 60° C. under 0.5 mm. pressure. The 4-ethoxycarbonyl-5,5-diphenylmercapto-1,3-dithiane thus obtained was analyzed with the following results:

*Analysis.*—Calculated for $C_{19}H_{20}S_4O_2$: C, 55.90%; H, 4.95%; S, 31.4%. Found: C, 54.62%; H, 4.94%; S, 31.7%, 31.8%.

In the above examples the acetals of this invention are made by condensing the 5-oxo-1,3-dithiane with an alcohol or mercaptan in the presence of a strong mineral acid. Other methods may be used including interaction of ortho esters with the oxo compound, interchange of alkoxy groups as set forth in greater detail in Wagner and Zook: "Synthetic Organic Chemistry," chapter 8, page 261. In the case of monohydric alcohols, which are less susceptible to acetal formation than mercaptans or dihydric alcohols, best results are obtained by using the alcohol, e. g. ROH, in the form of its orthoformic ester, $(RO)_3CH$, where R is hydrocarbon.

Alcohols and mercaptans usefully employable in preparing the acetals and thioacetals of this invention are those in which the only active hydrogen, as determined by the Zerewitinoff method, is that which stems from the hydroxyl or mercapto group. Examples are ethanol, pentanol, decanol, dodecanol, octadecanol, 1,2-ethanediol, mercaptoethanol, mercaptobutanol, ethanethiol, butanethiol, 1,3-propanediol, 1,2-ethanediol, 1,3-pentanediol, 1,3-octanediol, cis-1,2-cyclohexanediol, etc.

In preparing the acetals and thioacetals of this invention from alcohols or mercaptans and 5-oxo-1,3-dithianes, the mole ratio of alcohol or mercaptan to the oxo compound should be at least 2:1 in the case of the monohydric alcohol or monothiol and at least 1:1 in the case of the dihydric alcohol or dithiol. As already indicated, it is desirable to employ a much higher ratio in the case of the alcohols. The condensation may be effected at temperatures from ambient to 125° C. and at ordinary pressure in the presence of a strong, non-oxidizing mineral acid. Suitable mineral acids for the condensation are hydrochloric, sulfuric, phosphoric, etc.

Basic hydrolysis of the acetals and thioacetals of the 4-alkoxycarbonyl-5-oxo-1,3-dithianes leads to the formation of acetals and thioacetals of 4-carboxy-5-oxo-1,3-dithianes and this reaction is conveniently effected at ordinary pressures and at temperatures up to 100° C., with alkali in amount sufficient to provide a mole thereof per mole of acid liberated. After removal of the alcohol and the organic solvent used in the hydrolysis by distillation the salt solution is acidified to liberate the free acid. The acid separates and is removed by filtration or other methods known to those skilled in the art.

Decarboxylation of the acid produced as above by heating at 80°–200° C. yields the corresponding acetals or thioacetals of the 5-oxo-1,3-dithiane.

The compounds of this invention may be unsubstituted or may carry substituents on the carbons of the dithiane ring. Thus the dithiane ring carbons in positions 2, 4, and 6 may carry substituents. Examples of such substituents are lower alkyl, lower alkoxycarbonyl, carboxyl, chloroformyl, carbamoyl, phenyl, and chlorophenyl radicals.

When the alcohols and mercaptans listed in Table I, below, are substituted, in the process of Example 1, for the ethylene glycol of that example, there are obtained the acetals and thioacetals listed in Table I.

Table I

| Alcohol | Acetal and Thioacetal |
|---|---|
| Ethanol | 4-Ethoxycarbonyl-5, 5-diethoxy-1, 3-dithiane. |
| Octanol-1 | 4-Ethoxycarbonyl-5, 5-dioctyloxy-1, 3-dithiane. |
| 1, 3-Propanediol | 7-Ethoxycarbonyl-1, 5-dioxa-8, 10-dithiaspiro[5.5]undecane. |
| 2-Methyl-1, 3-propanediol | 7-Ethoxycarbonyl-3-methyl-1, 5-dioxa-8, 10-dithiaspiro[5.5]undecane. |
| Cyclohexanol | 4-Ethoxycarbonyl-5, 5-dicyclohexyloxy-1, 3-dithiane. |
| Hexylmercaptan | 4-Ethoxycarbonyl-5, 5-bis(hexylmercapto)-1, 3-dithiane. |
| 2-Mercaptoethanol | 6-Ethoxycarbonyl-8, 8-dimethyl-1-oxa-4, 7, 9-trithiaspiro[4.5]decane. |

When the acetals and thioacetals listed in Table II, below, are substituted, in the process of Example II, for the 6 - ethoxycarbonyl - 1,4 - dioxa - 7,9 - dithiaspiro-[4.5]decane of that example, there are obtained the acids listed in Table II below.

Table II

| Acetal and Thioacetal | Acid |
|---|---|
| 4-Ethoxycarbonyl-5,5-diethoxy-1,3-dithane. | 4-Carboxy-5,5-diethoxy-1,3-dithiane. |
| 4-Ethoxycarbonyl-5,5-dioctyloxy-1,3-dithiane. | 4-Carboxy-5,5-dioctyloxy-1,3-dithiane. |
| 7-Ethoxycarbonyl-1,5-dioxa-8,10-dithiaspiro[5.5]-undecane. | 7 - Carboxy - 1,5 - dioxa - 8,10-dithiaspiro[5.5]undecane. |
| 7 - Ethoxycarbonyl - 3 - methyl - 1,5-dioxa-8,10-dithiaspiro-[5.5] undecane. | 7 - Carboxy - 3 - methyl - 1,5 - dioxa - 8,10 - dithiaspiro[5.5] - undecane |
| 6-Ethoxycarbonyl-8,8-dimethyl-1 - oxa - 4,7,9 - trithiaspiro[4.5] decane. | 6 - Carboxy - 8,8 - dimethyl - 1 - oxa-4,7,9 - trithiaspiro[4.5] decane. |
| 4 - Ethoxycarbonyl - 5,5 - dicyclohexyloxy-1,3-dithiane. | 4-Carboxy-5, 5 - dicyclohexyl - oxy-1,3-dithiane. |
| 4-Ethoxycarbonyl-5,5 - bis - (hexylmercapto)-1,3-dithiane. | 4 - Carboxy - 5,5 - bis(hexylmercapto)-1,3-dithiane. |

When the acids, listed in Table III below, are substituted, in the process of Example III, for the 4-carboxy-1,4-dioxa-7,9-dithiaspiro[4.5]decane of that example, there are obtained the acetal dithianes listed in Table III.

Table III

| Acid | Acetal and Thioacetal Dithiane |
|---|---|
| 4-Carboxy-5,5-diethoxy-1,3-dithiane. | 5,5-Diethoxy-1,3-dithiane. |
| 4-Carboxy-5,5-dioctyloxy-1,3-dithiane. | 5,5-Dioctyloxy-1,3-dithiane. |
| 4 - Carboxy - 1,5 - dioxa - 8,10 - dithiaspiro [5.5] undecane. | 1,5-Dioxa-8,10-dithiaspiro- [5.5] undecane. |
| 7 - Carboxy - 3 - methyl - 1,5 - dioxa-8,10-dithiaspiro-[5.5] undecane. | 3 - Methyl - 1,5 - dioxa - 8,10 - dithiaspiro [5.5] undecane. |
| 4-Carboxy-5,5-dicyclohexyloxy-1,3-dithiane. | 5,5-Dicyclohexyloxy-1,3-dithiane. |
| 4-Carboxy-5,5-bis(hexylmercapto)-1,3-dithiane. | 5,5 - Bis(hexylmercapto) - 1,3 - dithiane. |
| 6 - Carboxy - 8,8 - dimethyl - 1 - oxa-4,7,9-trithiaspiro-[4.5]decane. | 8,8 - Dimethyl - 1 - oxa - 4,7,9 - trithiaspiro[4.5]decane. |

The acetal and thioacetal dithianes listed in the right column of Table III can also be obtained directly from the corresponding 5-oxo-1,3-dithianes by methods well known to those skilled in the art. Thus, reaction of ethylene glycol with 5-oxo-1,3-dithiane in the presence of an acid yields 1,4-dioxa-7,9-dithiaspiro[4.5]decane, as shown in Example XII.

The acetals of this invention are useful chemical intermediates. They can, for example, be oxidized to sulfones which can be used as plasticizers for polymeric materials, e. g., polyvinyl alcohol. They are also useful as rancidity inhibitors for vegetable oils, as illustrated below:

A 50% solution in benzene of a commercially available edible cottonseed oil was divided into three 2-g. portions. One portion was used as a control (no added agent), and to each of the other portions there was added 0.01 g. of 6-carboxy-1,4-dioxa-7,9-dithiaspiro[4.5]decane and 6 - carboxy - 8,8 - dimethyl -1,4 - dioxa - 7,9 - dithiaspiro[4.5]decane, respectively, i. e., 1% based on the weight of the oil. Clear solutions were formed on gentle stirring. Separate pieces of filter paper were dipped into each of the solutions, blotted to remove excess solution, and dried in air at room temperature until all the benzene had evaporated (approximately 15 minutes). The weight of oil on the filter paper was about 0.25 g. in each case. The filter papers were placed in separate wide-mouth, screw-top glass bottles, kept at 65° C., and examined daily for development of rancidity. The control developed rancidity in 7 days while the samples containing the compounds of this invention showed no rancidity development over 13 days under the same conditions.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A 1,3-dithiane in which the annular carbon in position 5 is attached by single bonds to each of two bivalent chalcogens of atomic number less than 17, the remaining valences of each of said chalcogens being satisfied by members of the class consisting of saturated monovalent hydrocarbon radicals of up to eighteen carbon atoms and saturated divalent hydrocarbon radicals of up to eight carbons and of two to three carbons between the free valences, any other substituent on dithiane ring carbon being selected from the class consisting of lower alkyl, lower alkoxycarbonyl, carboxyl, chloroformyl, carbamoyl, phenyl, and chlorophenyl radicals.

2. A 1,3-dithiane in which the annular carbon in position 5 is attached by single bonds to each of two bivalent chalcogens of atomic number less than 17, the remaining valences of said chalcogens being satisfied by a saturated divalent hydrocarbon radical of up to eight carbons and of two to three chain carbons between the free valences, any other substituent on dithiane ring carbon being selected from the class consisting of lower alkyl, lower alkoxycarbonyl, carboxyl, chloroformyl, carbamoyl, phenyl, and chlorophenyl radicals.

3. 1,4-dioxa-7,9-dithiaspiro[4.5]decane.

4. A 1,3-dithiane in which the annular carbon in position 5 is attached by single bonds to each of two chalcogens of atomic number less than 17, the remaining valences of each of said chalcogens being satisfied by saturated monovalent open chain hydrocarbon radicals of up to eighteen carbons, any other substituent on dithiane ring carbon being selected from the class consisting of lower alkyl, lower alkoxycarbonyl, carboxyl, chloroformyl, carbamoyl, phenyl, and chlorophenyl radicals.

5. 6 - ethoxycarbonyl - 1,4 - dioxa - 7,9 - dithiaspiro-[4.5]-decane.

6. The acetal of 4-ethoxycarbonyl-5-oxo-1,3-dithiane with a saturated dihydroxyhydrocarbon of up to eight carbon atoms of two to three carbons between the hydroxyls.

7. The mercaptol of 4-ethoxycarbonyl-5-oxo-1,3-dithiane with a saturated monomercaptohydrocarbon of up to six carbons.

8. 4 - ethoxycarbonyl - 5,5 - diphenylmercapto - 1,3 - dithiane.

9. The ethylene glycol acetal of a 5-oxo-1,3-dithiane wherein any other substituent on dithiane ring carbon is selected from the class consisting of lower alkyl, lower alkoxycarbonyl, carboxyl, chloroformyl, carbamoyl, phenyl, and chlorophenyl radicals.

No references cited.